No. 636,980. Patented Nov. 14, 1899.
J. GOETTEL.
TRUCK FOR ELECTRIC CARS.
(Application filed Apr. 18, 1899.)
(No Model.) 3 Sheets—Sheet 1.

WITNESSES
INVENTOR

No. 636,980. Patented Nov. 14, 1899.
J. GOETTEL.
TRUCK FOR ELECTRIC CARS.
(Application filed Apr. 18, 1899.)

(No Model.) 3 Sheets—Sheet 2.

WITNESSES
Frank G. Parker
H. C. Cluff

INVENTOR
John Goettel

No. 636,980. Patented Nov. 14, 1899.
J. GOETTEL.
TRUCK FOR ELECTRIC CARS.
(Application filed Apr. 18, 1899.)

(No Model.) 3 Sheets—Sheet 3.

WITNESSES
Frank G. Parker
H. C. Clapp

INVENTOR
John Goettel

UNITED STATES PATENT OFFICE.

JOHN GOETTEL, OF BOSTON, MASSACHUSETTS.

TRUCK FOR ELECTRIC CARS.

SPECIFICATION forming part of Letters Patent No. 636,980, dated November 14, 1899.

Application filed April 18, 1899. Serial No. 713,485. (No model.)

*To all whom it may concern:*

Be it known that I, JOHN GOETTEL, of Boston, in the county of Suffolk and State of Massachusetts, have invented a new and useful Improvement in Trucks for Electric Cars, of which the following, taken in connection with the accompanying drawings, is a specification.

My invention relates to the construction of a motor-support as combined with a car-truck; and it consists in combining with the framework of an electric car truck a base-piece adapted to form the seat for the central springs and also the support or foundation for an electric motor, the objects being to make a cheap, efficient, and durable device for connecting the motor to the truck and axle and to avoid shock and undue strain on the parts. These objects I attain by means of the mechanism shown in the accompanying drawings, in which—

Figure 1:
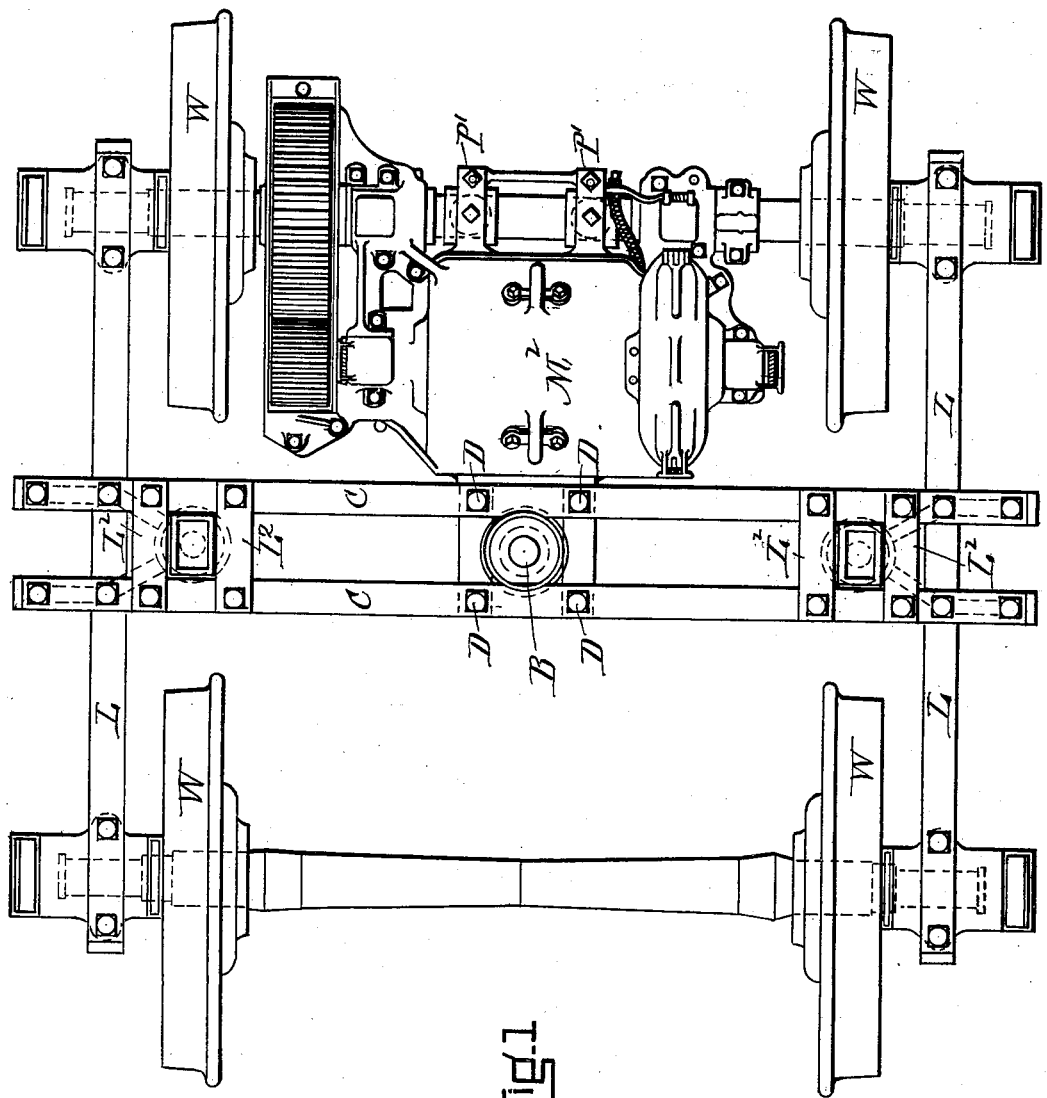
Figure 2:
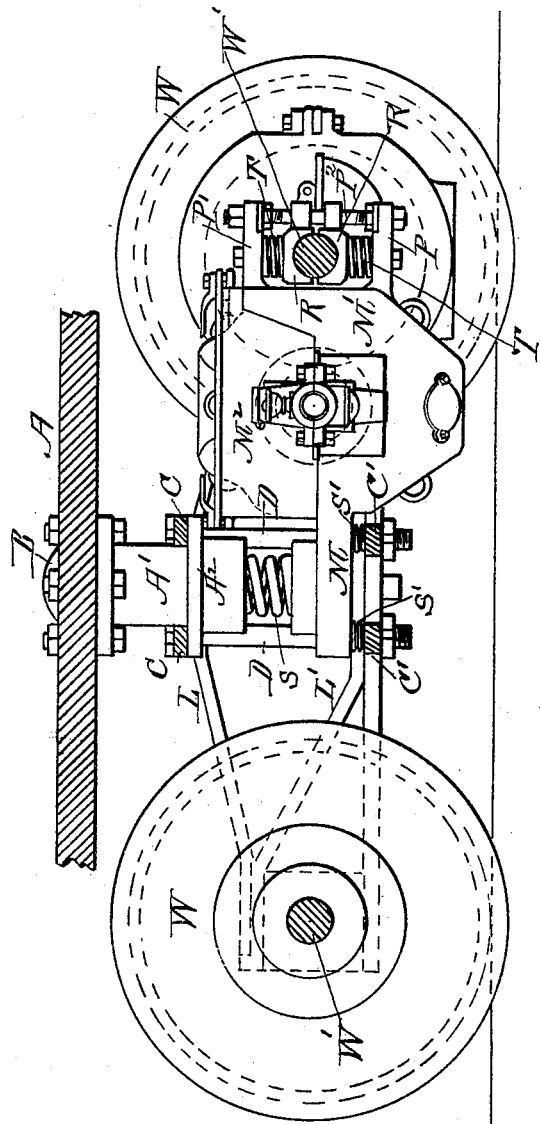
Figure 3:
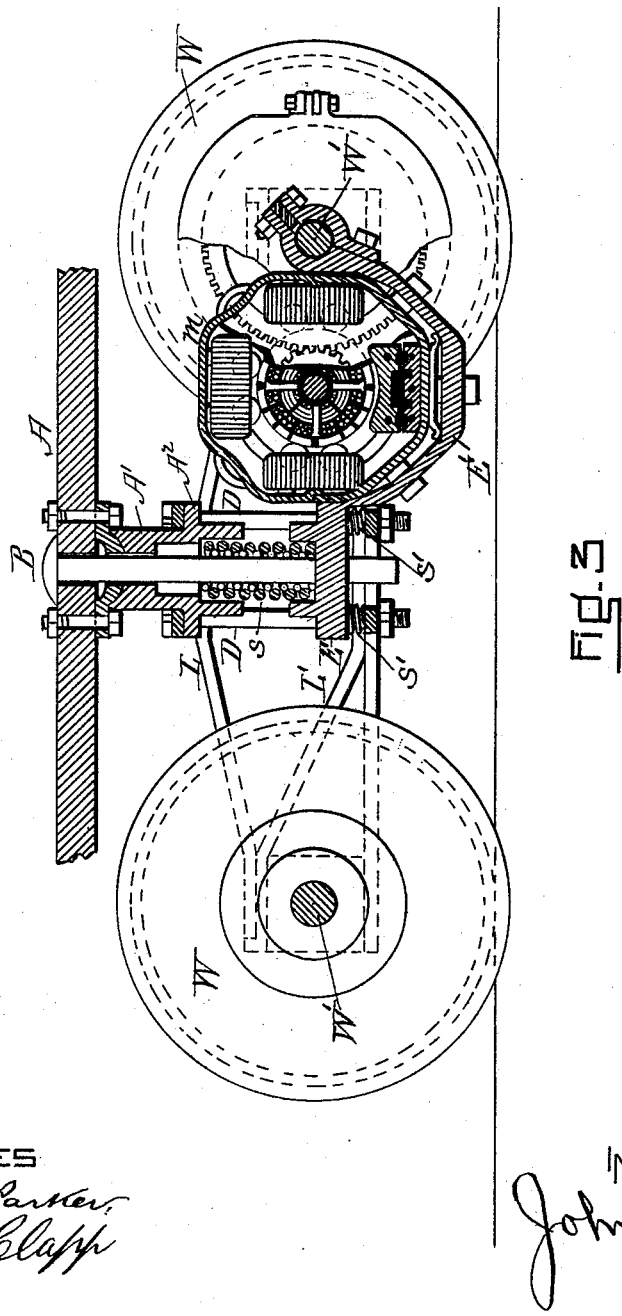

Figure 1 is a plan showing a truck-frame made up entirely of iron and having a motor supported by my improved device. Fig. 2 is a vertical longitudinal section showing a part of the truck-frame and the motor-support and motor. Fig. 3 is a vertical longitudinal section showing parts of the frame, the motor being shown in elevation.

The truck-frame illustrated is of the kind known as the "Goettel diamond truck" and need not be fully described in this specification. Attention is called to my Patent No. 348,459, dated August 31, 1886, for a car-truck.

A represents a part of the frame of a car-body, and B the transom-bolt. $A'A^2$ represent a transom-block firmly connected to the car-body and through which the transom-bolt passes. A spring or springs are placed at S and rest upon the base-piece M, Fig. 2, or, in a modification shown in Fig. 3, a base-piece E.

The framework of the truck is composed mainly of wrought-iron bars, as follows: L L L' L' are longitudinal bars connected at their ends to the axle-housings and centrally to cross-bars C C C' C'. The upper cross-bars C C are connected by bolts D D to the transom-block $A'A^2$ and the corresponding lower cross-bars C' C' to the base-plate M, Fig. 2, or, in the modification, to the base-plate E. The truck-frame also has longitudinal bars $L^2$, which are connected to the ends of the cross-bars C' C'. The base-piece M rests upon springs S' S', one at each of the bolts D D. Short cross-bars $L^2 L^2$, Fig. 1, give additional strength to the frame, all of the parts of which are firmly bolted together, as shown.

The wheels W W and the axles W' W' are of ordinary construction.

The internal construction of the motor is of any of the improved styles and has the ordinary transmitting-gears for connecting its armature-shaft to the ordinary axle of the car.

The motor-suspension devices and the combination of the same with the truck-frame constitute the novelty in this application and will now be set forth.

The base-piece M is integral with the lower part of the outer casing of the motor—that is, M M' represent a single casting or, possibly, forging. P and P' are sets of arms extending from the motor-case M' and serve as supports for the axle-bearings R R and the springs T T. Bolts $P^2$, Fig. 1, provided with nuts and checknuts, serve to hold the axle-bearings in place. By the above-described device the motor will be held securely to the axle and still have a yielding bearing, so as to avoid injury to the motor from violent shocks that the wheels may receive in rapid running. The part M, already referred to as the "base-piece," is supported on springs S' S', so that the motor is also elastically supported at its rear end. The upper part $M^2$ of the motor-casing is made in the usual manner for this class of motors and need not be described.

In Fig. 3 the motor-support E E' is made independently of the motor-casing, the casing being bolted or otherwise attached to it. This form of motor-support may be connected to the axle W', as shown in Fig. 3 or as shown in Fig. 2.

I claim—

1. In a truck for electric cars, a metallic framework a transom-block and a spring between said transom-block and a base-piece and said base-piece which serves as a foot-piece for the said spring or springs and forms an integral part of the motor-support, and also extending to the axle and having bearings resting upon said axle, substantially as and for the purpose set forth.

2. In a truck for electric cars, a metallic framework, a transom-block and a spring or springs between said transom-block and a base-piece, and said piece which forms a support for the motor and extends to the axle and has bearings resting upon said axle; and springs under said base-piece and resting upon the framework, substantially as and for the purpose set forth.

In testimony whereof I have signed my name to this specification, in the presence of two subscribing witnesses, on this 25th day of March, A. D. 1899.

JOHN GOETTEL.

Witnesses:
FRANK G. PARKER,
H. C. CLAPP.